Oct. 20, 1953     A. O. SAULSBURY     2,656,194
HARVESTER WITH AUTOMATIC LEVEL MAINTAINING APPARATUS
Filed Feb. 7, 1950     3 Sheets-Sheet 1

INVENTOR.
Albert O. Saulsbury
BY
Mason, Fenwick & Lawrence
ATTORNEYS

Oct. 20, 1953 A. O. SAULSBURY 2,656,194
HARVESTER WITH AUTOMATIC LEVEL MAINTAINING APPARATUS
Filed Feb. 7, 1950 3 Sheets-Sheet 2

INVENTOR.
Albert O. Saulsbury
BY
Mason, Fenwick & Lawrence
ATTORNEYS

Oct. 20, 1953 — A. O. SAULSBURY — 2,656,194
HARVESTER WITH AUTOMATIC LEVEL MAINTAINING APPARATUS
Filed Feb. 7, 1950

INVENTOR.
Albert O. Saulsbury
BY
Mason, Fenwick & Lawrence
ATTORNEYS

UNITED STATES PATENT OFFICE 2,656,194

HARVESTER WITH AUTOMATIC LEVEL MAINTAINING APPARATUS

Albert O. Saulsbury, Ridgely, Md.

Application February 7, 1950, Serial No. 142,911

3 Claims. (Cl. 280—6)

This invention relates to a harvester with automatic level maintaining instrumentalities.

The type of harvester in contemplation is a vining harvester, of which there are a number on the market, comprising a power revolved drum having a perforated peripheral wall, into one end of which drum pea or bean vines or the like are fed by a conveyor. The drum contains a longitudinal beater, the arms of which have the dual function of conveying the vines from the receiving to the discharge end of the drum, and of thrashing or beating the vines many times, enroute, splitting the pods and knocking out the peas or beans. The latter drop through the perforations in the peripheral wall of the drum. Underneath the drum is a broad vibratory separating belt, the active flight of which moves in an upward direction in an inclined plane, receiving the seeds, as well as leaves and other debris incidental to the beating operation, and which generally come under the name of "trash," which comes through the perforations with the seeds. The trash travels to the upper edge of the separating belt and is dumped over. The peas and beans being more or less round, gravitate down the inclined plane to a trough at the bottom, from which they are suitably collected.

The angle of slope of the upper flight of the separating belt is rather critical, for the belt is as a rule, covered with the trash, which forms an impediment to the free gravitational downward roll of the seeds, so that if the slope of the belt should become appreciably diminished, with respect to the optimum angle to which it is set, the seeds might be carried up and over with the trash.

Such a harvester as has been described is designed to have the vines pass longitudinally through the drum at a uniform rate of travel, a condition that can be maintained only when the axis of the drum and beater is horizontal. If the drum inclines downward toward the receiving end, the vines pile up in a mass which rotates with the drum instead of being lifted by the drum and dropped into the path of the beater arms repeatedly as it travels longitudinally. This results in inadequate beating. If the drum inclines downward toward the discharge end, the vines pass too rapidly through it and are not thrashed a sufficient number of times by the beater arms, so that the harvesting is imperfectly done.

Ordinarily, harvesters of this type are stationary installations to which the crop is brought for harvesting. No problem is present relative to supporting them in operative position for optimum performance.

Lately, it has been attempted to mount a harvester of this type as a portable unit, taking it into the field and picking up the vines which have been cut and raked into windrows. Differences in the grade of the terrain of the field which would disturb the level of the harvester and interfere with its proper operation, have been compensated by suspending the harvester in balanced position in a gimbal. This expedient is not the full answer to the problem of maintaining level a portable harvester of this type, for while the gimbal may keep the harvester level relative to ground inequalities, it will not maintain it level with respect to unbalancing factors arising within the harvester itself. For example, when the harvester is started, the weight of vines coming in at the receiving end will tip it downwardly toward that end and the rate of travel of the material through the harvester is slowed down, since it must travel up hill, so that there is a continual piling of the material at the receiving end, and continual longitudinal unbalance. Furthermore, since the beater rotates equidirectionally, the vines will be continually drawn to one side of the drum, unbalancing it laterally.

The object of the present invention is to maintain the harvester level notwithstanding level disturbing influences arising from within, as well as outside of the harvester.

Other objects of the invention will appear as the following description of a practical embodiment thereof proceeds.

In the drawings, throughout the figures of which the same reference characters have been used to denote identical parts:

Figure 4 is an enlarged side view partly in section, of one of the level responsive control switches;

Figure 1:
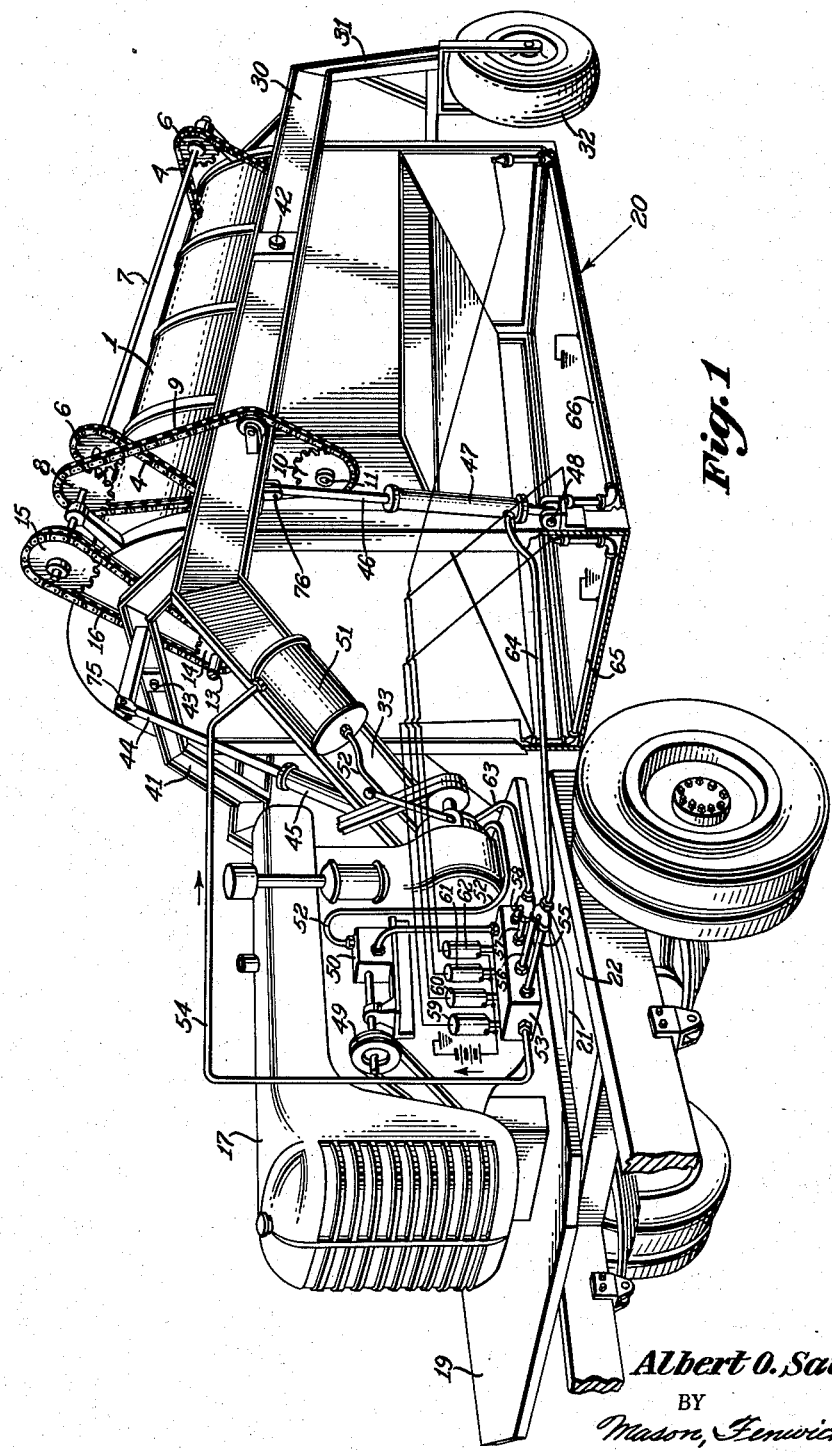
Figure 1 is a perspective view of a vehicular pea or bean harvester and the adjacent part of the tractor that draws it, embodying the principles of the invention.
Figure 2:
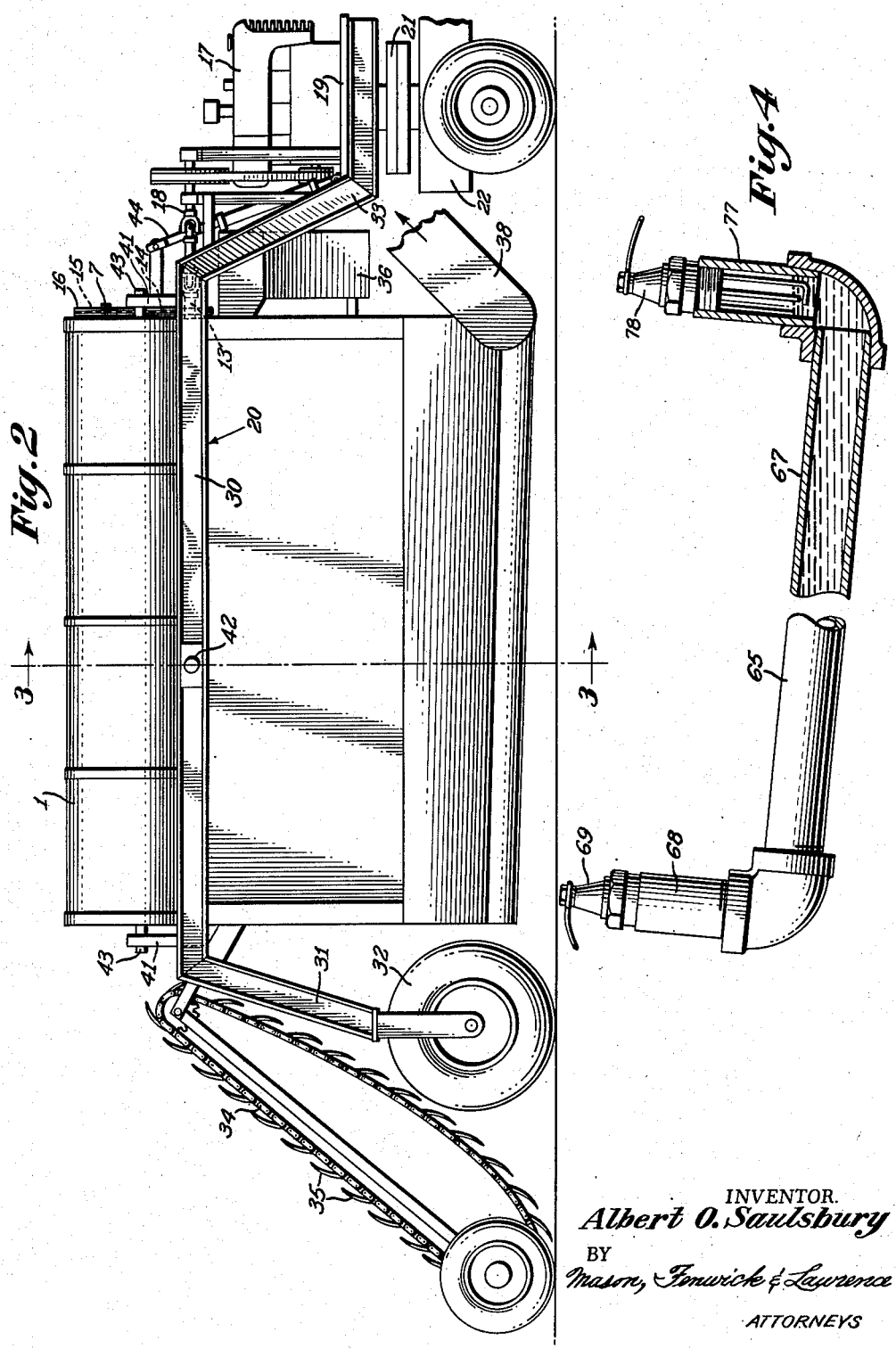
Figure 2 is a side elevation of the apparatus shown in Figure 1.
Figure 3:
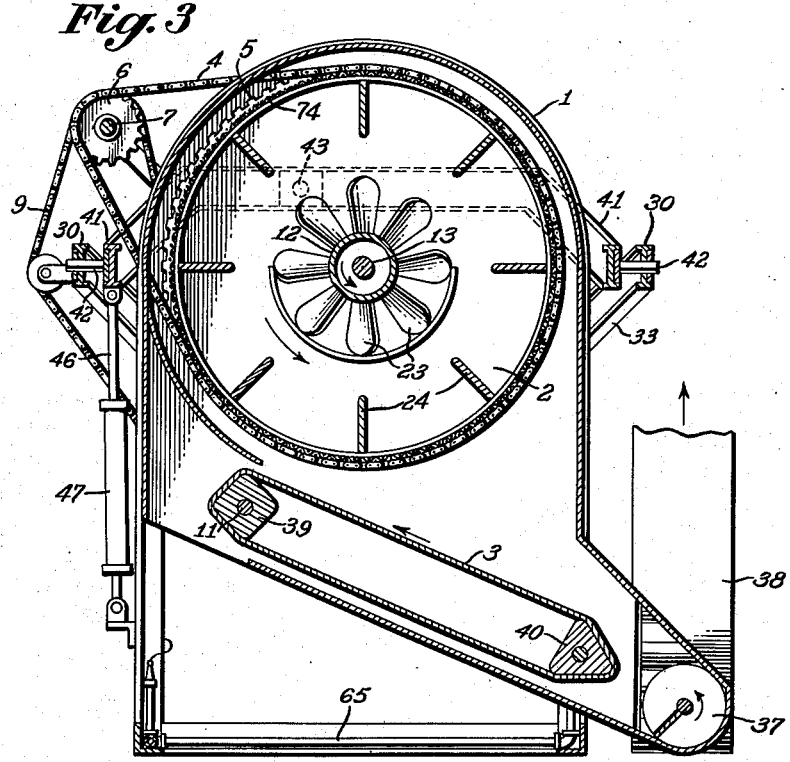
Figure 3 is a cross-section taken along the line 3—3 of Figure 2.

Referring now in detail to the several figures, the harvester comprises a casing 1, which in the upper part houses a rotary drum 2, and in the lower part, beneath the drum, an inclined vibratory separating belt 3. The drum 2 is rotated by means of chains 4 about circumferential sprockets 5, from sprockets 6 on a drive shaft 7, which through sprocket 8, chain 9 and sprocket 10, drives the shaft 11, which operates the separating belt 3. Inside the drum 2, coaxial therewith, is the beater 12 on a shaft 13, connected to the drive shaft 7 by the sprockets 14, 15 and chain 16. The drive shaft 7 derives power from the shaft 13, which is driven from the prime mover 17, the connection between said shafts being designated as 18. The prime mover 17, which is an internal combustion engine, is on a platform 19, that in the present instance is carried by the frame of the tractor drawn vehicle 20, which carries the harvester and is supported at its forward end through a fifth wheel connection 21, by the rear end of the tractor 22.

The beater 12 has radially extending arms or paddles 23, at intervals from end to end, which are inclined so as to have a conveyor function, and there are longitudinally extending vanes 24 projecting inwardly from the cylindrical side wall of the drum.

The vehicle which suspends the harvester comprises a main frame 30, having downward extensions 31 at the rear, supported by the vehicle wheels 32. At the front the main frame includes the forward extensions 33 that carry the platform 19. An elevator 34 trails the main frame, having its upper end in proximity to the adjacent end of the drum 2, which is open. Tines 35 on the elevator pick up vines from the windrow and deliver them to the rear or receiving end of the drum. Inside the drum they are lifted by the vanes 24 and dropped into the path of the rapidly rotating arms 23 of the beater, which open the pods, releasing the seed. The arms 23 also convey the vines longitudinally through the drum, during which traverse the vines are repeatedly lifted, dropped and beaten. The seeds and small trash fall through the perforations 74 in the wall of the drum upon the separating belt 3. The parts of the vines which pass through the drum are discharged at the distal end by way of a chute 36. The peas or beans are caught in a screw 37, adjacent the lower edge of the belt 3. The screw 37 delivers the hulled seeds to a conveyor 38, which carries them to any convenient point to be bagged.

The belt 3 passes over rollers 39 and 40, one of which is square in cross-section, and the other triangular, whereby a whipping or vibratory movement of the surface of the belt is produced which causes the peas or beans to jump over obstructive pieces of the trash being carried upwardly on said belt.

An intermediate frame 41 is supported from the main frame by transverse trunnions 42. The harvester is suspended within the intermediate frame by the longitudinal trunnions 43.

The broad concept of the invention is to provide means responsive to tilt of the harvester to positively and immediately restore it to level position. Two alternative embodiments of the invention are shown. In each, the level is restored by hydraulic plungers, electrically operated by switches which respond to slight tilting of the harvester, either longitudinally or transversely.

Referring now to Figures 1 to 4, inclusive, these show a form of the invention in which single acting plungers 44 and 46 are employed, that is, plungers which are forced against the weight of the harvester. In this form of the invention the trunnions are not placed at the longitudinal and transverse equilibrium points; therefore, they do not constitute a gimbal. Instead, the trunnions 42 are placed back of the longitudinal equilibrium points, so that the preponderance of weight is always forward of the axis of the trunnions, and the intermediate frame 41, together with the harvester, is gravitationally biased to tilt downward at the forward end. Likewise, the trunnions 43 are offset laterally with respect to the axis of transverse equilibrium (in the direction toward the observer as viewed in Figure 1), biasing the harvester to tilt in a counterclockwise direction, as viewed in Figure 1.

Figure 5:
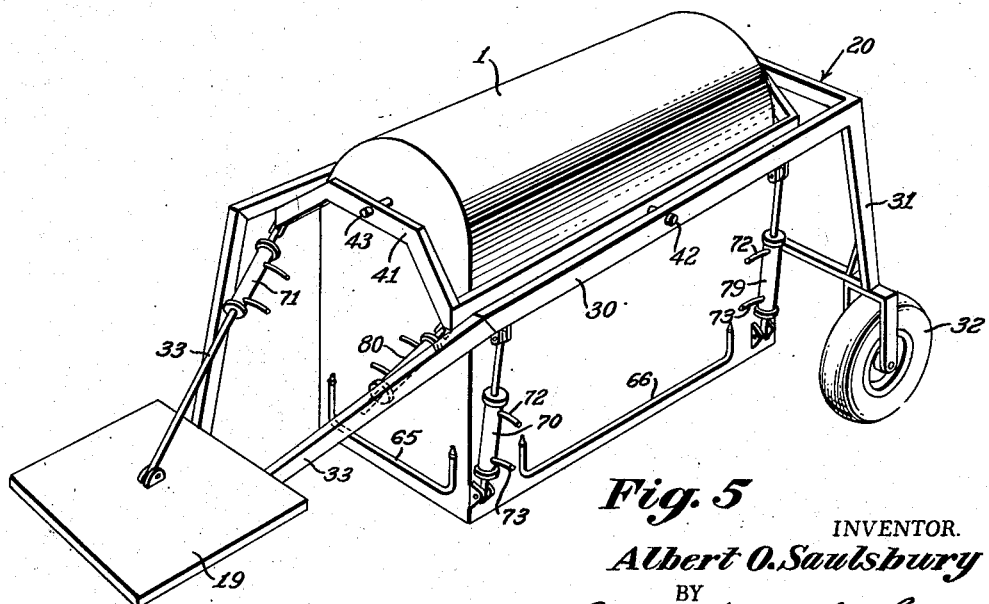
Figure 5 is a perspective view showing a modified form of the invention.

The heavy end of the intermediate frame with the harvester is supported by the plunger 44, the upper end of which is pivotally connected to the heavier side of the intermediate frame 41 at 75, and the cylinder of which is pivotally mounted on the platform 19 at a point 81, Figure 5, which platform as has been stated, is rigid with the main frame. The lateral tilt of the harvester is opposed by the reaction of the plunger 46, the upper end of which is pivotally anchored to the main frame at 76 and the cylinder of which is pivotally attached to the harvester at 48.

A conventional hydraulic pressure system is associated with the prime mover 17, comprising the power take-off 49 from the engine, which drives an oil pump 50, drawing oil from a reservoir 51, by way of a pipe 52, and returns it to the reservoir through a manifold 53, containing the conventional spring-loaded by-pass, not shown, through the pipe 54. Four pipes 55, 56, 57 and 58 debouch from the manifold. These are controlled by valves, not shown, opened by respective solenoids 59, 60, 61 and 62. Two of said pipes supply fluid pressure to the respective plungers. Two convey the released liquid back to the manifold, permitting return of the plungers gravitationally to repose position. Since in this form of the invention the plungers are single acting, the pressure and release pipes are united as branches of the single pipes 63 and 64 leading to the lower ends of the respective cylinders. The reference numeral 55 denotes the pressure pipe to cylinder 47, the valve in which pipe being operated by solenoid 59. The pressure pipe 57 serves the cylinder 45, the valve controlling said pipe being operated by the solenoid 61. Solenoids 60 and 62 operate the valves which control the respective release pipes 56 and 58.

The solenoids are energized and de-energized by the tilting type mercury switches 65 and 66, one of which is shown in Figure 4. It comprises a long straight tube 67, extending substantially the full length or width of the harvester, as the case may be, having upturned ends 68 and 77 into which insulated contacts such as the spark plugs 69 and 78 or equivalent electrode devices are screwed, an electrode of each being grounded, in the embodiment shown. The tube 67 contains mercury. Due to the length of the tube 67 and the quantity of mercury displaced even when the switch is tilted very slightly, the mercury will inundate the electrodes at one or the other end, closing a circuit through said electrodes.

The switches 65 and 66 are arranged on one side and one end of the harvester, in such manner as to be in a level plane or in parallel planes when the axis of rotation of the drum 2 and of the beater 12 are horizontal and the inclination of the separating belt is at the proper angle of slope for optimum operation.

Referring to Figure 1, the spark plug 69 at the lefthand side of switch 65 is in circuit with the solenoid 59 and the one at the righthand side is in circuit with the release solenoid 60. If the harvester tilts in a counterclockwise direction, the mercury in the switch 65 runs toward the left end of the tube, closing the circuit through the solenoid 59, thereby causing said solenoid to open the valve controlling the pipe 55. This causes the plunger cylinder 47 to push the harvester back to transversely level position. When the level position has been attained, the mercury in the tube breaks the circuit between the electrodes of the lefthand spark plug 69, de-energizing the solenoid 59, which closes the valve in pipe 55. This locks the plunger cylinder 47 in position. Should the harvester tilt in a clockwise direction, the mercury will run down into the righthand end of the tube 65, closing the circuit through the solenoid 60, which controls the release valve in pipe 56, opening said valve and permitting drainage of oil from the body of oil in the cylinder 47 which is sustaining the plunger 46. The weight of the harvester will push the cylinder 47 upward, displacing oil from the cylinder 47 until the level position of the harvester is reached, at which time the mercury will break the circuit in the spark plug at the right end of the switch, de-energizing the solenoid 60, which closes the valve of pipe 56, cutting off further drainage of oil from the plunger cylinder 47, thereby maintaining the harvester level.

Normally, the plunger 44 maintains the harvester, together with the intermediate frame 41, longitudinally level. Should the forward end of the harvester dip, mercury will run down in the switch tube 66 toward the lefthand end, closing the circuit through the electrodes of the spark plug 69 and through the solenoid 61 supplying liquid under pressure to the cylinder 45, which raises the harvester and intermediate frame to level position. When this position is reached, the mercury flows back from the lefthand spark plug 69, breaking the pressure circuit. Should the harvester become downwardly inclined toward the rear, the mercury flows in the switch tube 66 toward the righthand end, closing the circuit which energizes solenoid 62 and opens the release valve in the pipe 58. The unbalanced weight of the harvester and intermediate frame bears upon the plunger 44 and forces liquid back into the manifold until level position of the harvester and intermediate frame is restored, whereupon, the tube 66 will again be level and the mercury therein out of contact with either of the spark plugs. In this position of the switch the release valve controlled by solenoid 62 will be closed, maintaining the plunger 44 fixed.

In the above described system the weight has been unevenly distributed with respect to the trunnions to provide a gravitational component for moving the hydraulic plunger in a direction contra to their power stroke, as the plungers are all of a single acting type. Figure 5 shows an arrangement in which double acting hydraulic plungers are employed. Since no dominant weight factor is utilized to return the plungers, the trunnions 42 and 43 are at medial points in the length and width of the harvester, so that it is suspended by a gimbal, but is not freely balanced on account of the presence of the plungers, which restore it to level position respective to unbalancing conditions arising both from ground inequalities and factors existing within the harvester itself.

In Figure 5 there are two hydraulic units 70 and 79 at one side, for turning the harvester in either direction about the axis of the trunnions 43, and two hydraulic units 71 and 80 at one end, for turning the harvester in either direction about the axis of the trunnions 42. The hydraulic units of a pair work in unison and in the same phase, two being employed, since the units may be smaller and less costly than a single unit, and the applied force more uniformly distributed. A single unit of each pair, such as the units 70 and 80 adjacent the near corner of the harvester, as viewed in Figure 5, are however sufficient.

The solenoid valves in the hydraulic system, and the circuits therefor (neither valves nor circuits being shown) are so arranged that when the switch 65 dips in clockwise direction, fluid pressure is applied through the pipe 72 to the upper side of the plunger units 70 and 79, moving the harvester counterclockwise. At the same time, the fluid at the under side of the plunger is released through the pipe 73. When the switch 65 dips in the opposite direction, the functions of the valves controlling the pipes 72 and 73 are reversed. Upon the dipping of the longitudinal switch 66, the plunger units 71 and 80 are operated in similar manner, to compensatingly tilt the intermediate frame 41, and with it the harvester, in a longitudinal direction.

While I have in the above description disclosed what I believe to be practical embodiments of the invention, it will be understood by those skilled in the art that the specific details of construction and arrangement of parts, as shown and described, are by way of example and not to be construed as limiting the scope of the invention.

What I claim as my invention is:

1. In harvesting apparatus, a wheel-supported frame, an intermediate frame supported by said wheel-supported frame tiltably about a horizontal axis, a vining harvester of the type which operates with optimum efficiency when level, supported by said intermediate frame tiltably about a horizontal axis perpendicular to the axis of tilt of said intermediate frame, hydraulic means interacting between said harvester and wheel-supported frame for maintaining said harvester plumb with respect to its axis of support in said intermediate frame, other hydraulic means reacting between said wheel-supported frame and intermediate frame for maintaining the latter plumb with respect to its axis of support in said wheel-supported frame, and independent control means for the respective hydraulic means, mounted on said harvester, actuated respectively responsive to movements of the harvester incident to deviations of the latter from its plumb position with respect to its axis of support, and deviations of said intermediate frame from its plumb position with respect to its axis of support, for restoring said harvester and said intermediate frame to their respective plumb positions.

2. In harvesting apparatus, a vehicle of the tractor drawn type including a vehicle frame, a vining harvester for peas, beans, etc., of the type which operates with optimum efficiency when level, a frame intermediate said harvester and vehicle frame, coaxial trunnions tiltably suspending said intermediate frame from said vehicle frame, coaxial trunnions tiltably suspending said harvester frame from said intermediate frame, the axes of said trunnions being perpendicular to one another and offset respectively with reference to the corresponding axes of equilibrium of the suspended structures, hydraulic means reacting between said vehicle frame and the harvester on the overbalanced side of the latter with respect to its axis of suspension, other hydraulic means reacting between said vehicle frame and said intermediate frame on the overbalanced side of the latter with respect to its axis of suspension, control means for said first mentioned hydraulic means mounted on said harvester to rock therewith on an axis parallel to its axis of suspension and control means for said other hydraulic means mounted on said harvester to rock therewith on an axis parallel to the axis of suspension of said intermediate frame.

3. In harvesting apparatus, a vehicle of the tractor drawn type including a vehicle frame, a vining harvester for peas, beans, etc., of the type which operates with optimum efficiency when level, a frame intermediate said harvester and vehicle frame, coaxial trunnions tiltably suspending said intermediate frame from said vehicle frame, coaxial trunnions tiltably suspending said harvester frame from said intermediate frame, the axes of said trunnions being perpendicular to one another and offset with reference to the corresponding axes of equilibrium of the suspended structures, hydraulic means reacting between said vehicle frame and the harvester on the overbalanced side of the latter with respect to its axis of suspension, other hydraulic means reacting between said vehicle frame and said intermediate frame on the overbalanced side of the latter with respect to its axis of suspension, both of said hydraulic means being in a hydraulic system including solenoid valves for controlling the respective hydraulic means, a normally level mercury switch in circuit with the solenoid valve which controls the first mentioned hydraulic means, mounted on said harvester to rock therewith on an axis parallel to the axis of suspension of said harvester, and a normally level mercury switch in circuit with the solenoid valve which controls the other hydraulic means, mounted on said harvester to rock therewith on an axis parallel to the axis of suspension of said intermediate frame.

ALBERT O. SAULSBURY.

References Cited in the file of this patent

UNITED STATES PATENTS

| Number | Name | Date |
|---|---|---|
| 509,082 | Heald | Nov. 21, 1893 |
| 705,731 | Ach | July 29, 1902 |
| 894,439 | Hovland | July 26, 1908 |
| 1,064,440 | Brown | June 10, 1913 |
| 1,469,157 | Kast | Sept. 25, 1923 |
| 1,672,588 | Turnidge | June 5, 1928 |
| 1,941,143 | Wickersham | Dec. 26, 1933 |
| 2,083,674 | Smith | June 15, 1937 |
| 2,251,655 | Bostic | Aug. 5, 1941 |
| 2,278,081 | Kramer | Mar. 31, 1942 |
| 2,293,328 | Coburn | Aug. 18, 1942 |
| 2,310,930 | Blanchett | Feb. 16, 1943 |
| 2,365,387 | Briscoe | Dec. 19, 1944 |
| 2,472,944 | Furer et al. | June 14, 1949 |
| 2,504,289 | Waterman | Apr. 18, 1950 |
| 2,520,266 | Adams | Aug. 29, 1950 |
| 2,583,016 | Ritter et al. | Jan. 22, 1952 |